United States Patent [19]
Grayer et al.

[11] Patent Number: 5,568,023
[45] Date of Patent: Oct. 22, 1996

[54] ELECTRIC POWER TRAIN CONTROL

[76] Inventors: William Grayer, 15720 Ventura Blvd., #411, Encino, Calif. 91436; William R. Olson, 1196 Mellow La., Simi Valley, Calif. 93065; Harold A. Rosen, 14629 Hilltree Rd., Santa Monica, Calif. 90402

[21] Appl. No.: 246,230

[22] Filed: May 18, 1994

[51] Int. Cl.⁶ .................................................. H02P 1/00
[52] U.S. Cl. ........................... 318/139; 180/65.4; 180/165
[58] Field of Search ........................... 318/139, 140–158; 180/65.1–65.5, 301, 165; 60/39, 39.75

[56] References Cited

U.S. PATENT DOCUMENTS

| | | | |
|---|---|---|---|
| 3,970,160 | 7/1976 | Nowick | 318/85 X |
| 4,042,056 | 8/1977 | Horwinski . | |
| 4,126,200 | 11/1978 | Miller et al. | 180/66 R |
| 4,157,011 | 6/1979 | Liddle | 180/66 A |
| 4,187,436 | 2/1980 | Etienne . | |
| 4,211,930 | 7/1980 | Fengler . | |
| 4,313,080 | 1/1982 | Park . | |
| 4,407,132 | 10/1983 | Kawakatsu et al. . | |
| 4,414,805 | 11/1983 | Walker | 60/39.161 |
| 4,484,083 | 11/1984 | Jeffries | 316/696 X |
| 4,547,678 | 10/1985 | Metzner et al. . | |
| 4,603,555 | 8/1986 | Mayer . | |
| 4,723,735 | 2/1988 | Eisenhaure et al. . | |
| 4,951,769 | 8/1990 | Kawamura . | |
| 5,172,784 | 12/1992 | Varela, Jr. . | |
| 5,343,970 | 8/1994 | Severinsky | 180/165 |

*Primary Examiner*—David S. Martin
*Attorney, Agent, or Firm*—Raymond H. J. Powell, Jr.

[57] ABSTRACT

In a shared process control system for a power train of a hybrid electric vehicle operating responsive to operation of an accelerator pedal and a brake pedal and including a gas turbine powering a first motor-generator, a flywheel powering a second motor-generator, and a traction third motor-generator operatively coupled for selectively driving and being driven by vehicle wheels, each of the first, the second and the third motor-generators being commonly connected to a high voltage bus via respective rectifier-inverters controlled by a single controller, the control system is operated by a method including steps for operating of accelerator pedal to produce a substantially instantaneous increase in output torque with an increase in load on the bus by the traction motor to thereby produce a voltage drop, initiating increased power output from the flywheel motor-generator in response to the voltage drop to hold up bus voltage, thereby decreasing flywheel shaft speed, and subsequently producing a proportional increase in speed of the gas turbine in response to the decreasing shaft speed to thereby cause increased flow of fuel to the gas turbine so as to permit an increase in voltage provided by the first motor generator. A method for providing compressive braking is also described.

11 Claims, 14 Drawing Sheets

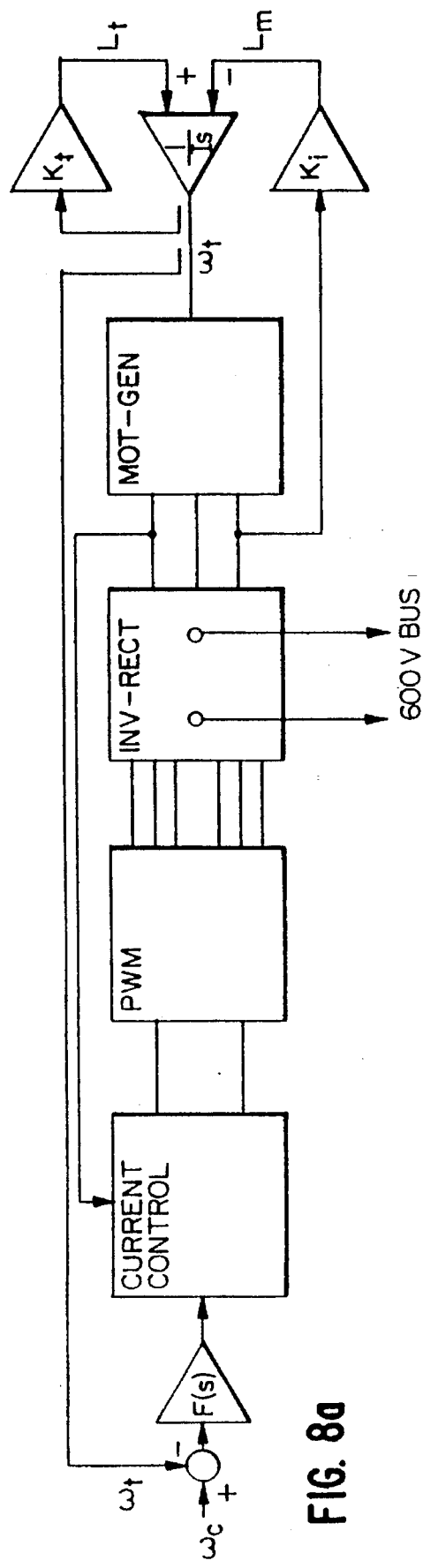
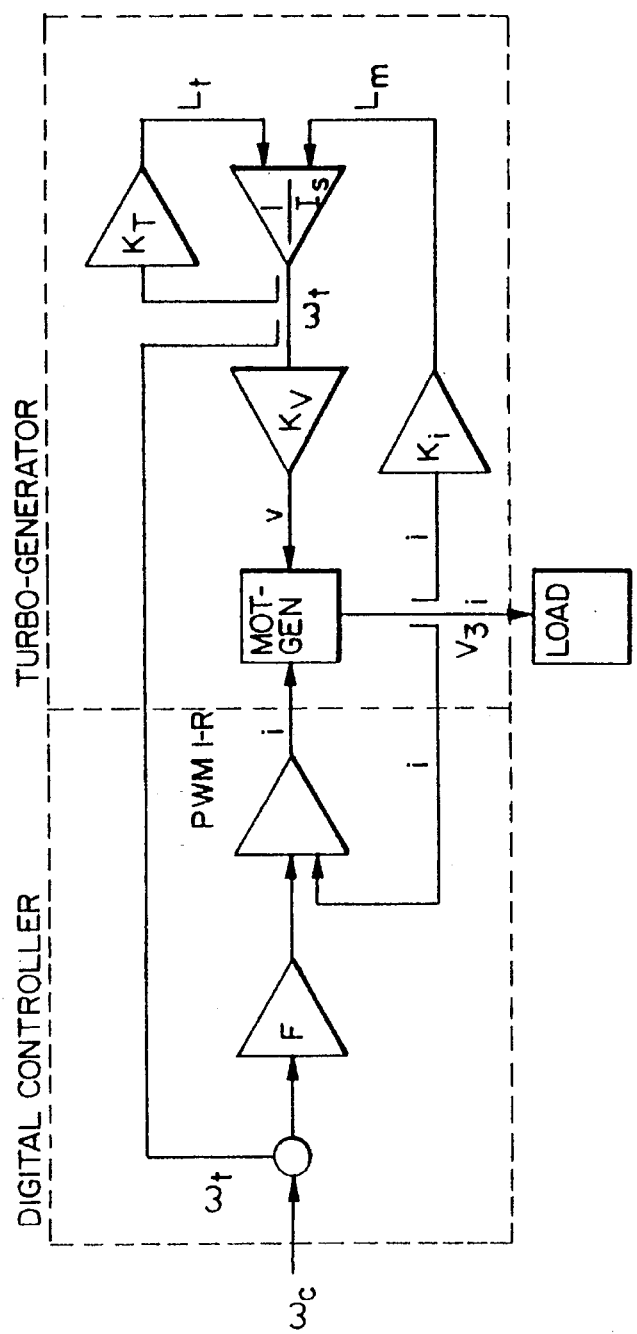
FIG. 8a
FIG. 8b

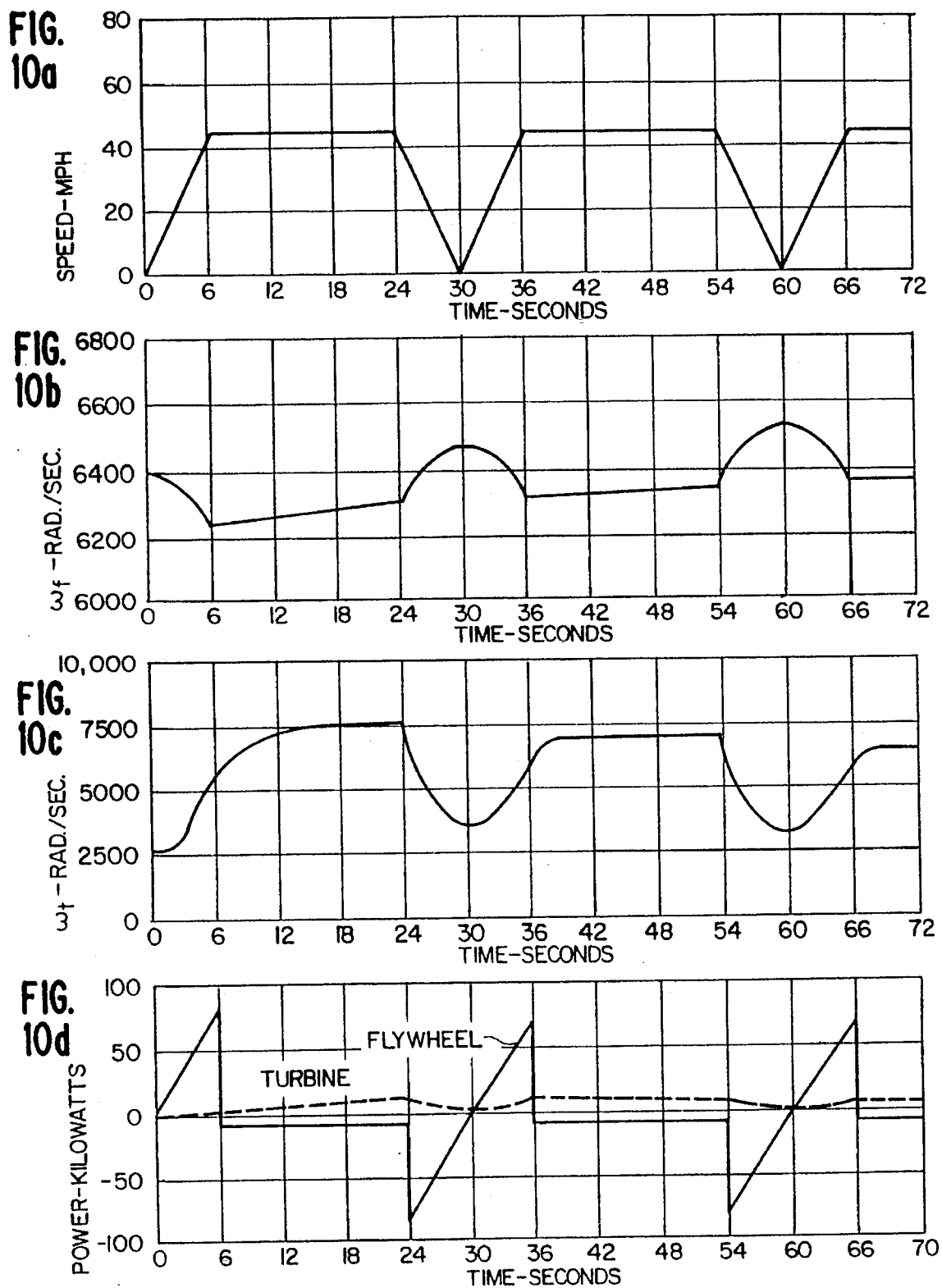

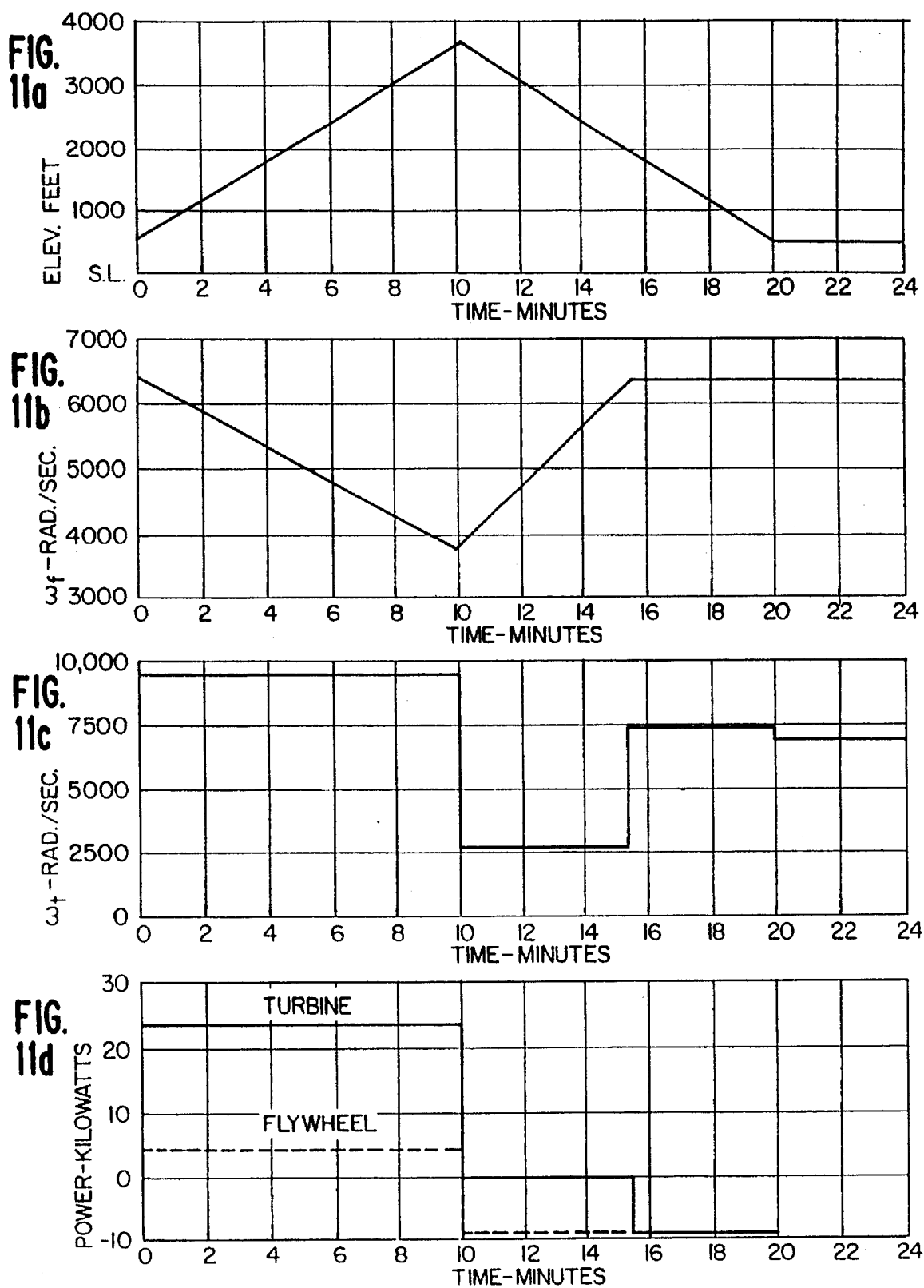

5,568,023

ELECTRIC POWER TRAIN CONTROL

BACKGROUND OF THE INVENTION

1. Field of the Invention

The present invention relates to an electronic control system of a power train for a hybrid electric vehicle. More specifically, the present invention relates to the electronic control system of a power train including three motor-generators.

According to one aspect of the invention, the power train includes a gas turbine and a flywheel, both of which contain motor-generators, and an electric traction motor-generator. According to another aspect of the invention, the present invention includes the logic and power electronics and the associated software with which to control the three motor-generators during all operating modes, i e., during the starting, accelerating, cruising, braking, hill climbing and hill descending modes of operations of the motor vehicle.

2. Description of Related Art

Numerous references describe methods of controlling hybrid vehicles powered by various combinations of heat engines and electrochemical batteries. For example, U.S. Pat. No. 4,042,056 discloses a system whereby an installed battery can be recharged by either house current or a mobile generator. U.S. Pat. No. 4,187,436 describes a solution to the difficult problem of management of the charge of the batteries and U.S. Pat. No. 4,211,930 discloses use of the traction motor in connection with regenerative braking.

U.S. Pat. No. 4,313,080 provides extensive disclosure regarding the management and use of nickel cadmium batteries in vehicle applications and U.S. Pat. No. 4,407,132 describes a synergistic combination of an engine driven generator and a battery for improving the fuel efficiency of the vehicle. More recently, U.S. Pat. No. 4,547,678 discloses the use of a signal processor in the control of the motor generator of a hybrid electric vehicle while U.S. Pat. No. 4,951,769 describes the use of inverters and rectifiers in hybrid electric vehicles. In a variation on conventional hybrid vehicles, U.S. Pat. No. 5,172,784 discloses the use of an external combustion, free piston engine which is capable of burning variety of fuels.

The paper entitled "Hybrid/Electric: Vehicle Design Options and Evaluations" by A. F. Burke, SAE International Congress and Exposition, Feb. 1992, describes a large variety of hybrid electric vehicle configurations, but does not provide any details regarding their respective control systems.

None of the power trains described in these patent references deal with the use of a flywheel for energy storage and surge power, the use of a gas turbine as the heat engine, or the interrelated dynamic control of such systems.

SUMMARY OF THE INVENTION

The principal object of the present invention is to provide an economical means of controlling the three motor-generators of the power train in the hybrid electric vehicle in all the modes of vehicle operation, in a manner which provides excellent fuel economy, high acceleration capability, and the minimum use of friction brakes.

These and other objects, features and advantages according to the present invention are provided by a shared processor control system for a power train of a hybrid electric vehicle operating responsive to operation of an accelerator pedal and a brake pedal and including a gas turbine powering a first motor-generator, a flywheel powering a second motor-generator, and a traction third motor-generator operatively coupled for selectively driving and being driven by vehicle wheels, each of the first, the second and the third motor-generators being commonly connected to a high voltage bus via respective rectifier-inverters controlled by a single controller, the control system characterized in that operation of the accelerator pedal produces substantially instantaneous torque in the traction motor, causing load on the bus from the traction motor thereby producing a voltage drop, the voltage drop initiating increased power output from the flywheel motor-generator to hold up the bus voltage, thereby decreasing flywheel shaft speed, the decreasing shaft speed producing a proportional increase in speed of the gas turbine to thereby cause increased flow of fuel to the gas turbine and to permit an increase in voltage provided by the first motor generator.

These and other objects, features and advantages according to the present invention are provided by a method for starting a gas turbine having a conventional combustor included in a power train of a hybrid electric vehicle including the gas turbine powering a first motor-generator, a flywheel powering a second motor-generator, and a traction third motor-generator operatively coupled for selectively driving and being driven by vehicle wheels in the event that the flywheel speed is allowed to decay to approximately zero revolutions per minute, the method comprising the steps of:

supplying energy to the first motor generator operating in a motor mode of operation via a battery; and igniting fuel supplied to the gas turbine through a fuel control valve.

These and other objects, features and advantages according to the present invention are provided by a method for starting a gas turbine having a catalytic combustor requiring preheating included in a power train of a hybrid electric vehicle incorporating the gas turbine powering a first motor-generator, a flywheel powering a second motor-generator, and a traction third motor-generator operatively coupled for selectively driving and being driven by vehicle wheels in the event that the flywheel speed is allowed to decay to approximately zero revolutions per minute, the method comprising the steps of:

charging a direct current high voltage bus from a battery;

rotating the flywheel using the second motor generator operating in a motor mode of operation powered from the high voltage so as to convert the direct current to stored energy; and operating the second motor generator in a generator mode of operation so as to provide an energy surge suitable for powering a catalytic heater associated with the catalytic combustor.

These and other objects, features and advantages according to the present invention are provided by a method of compressively braking a power train of a hybrid electric vehicle including a gas turbine powering a first motor-generator, a flywheel powering a second motor-generator, and a traction third motor-generator operatively coupled for selectively driving and being driven by vehicle wheels, the method comprising the steps of:

selectively operating the third motor-generator in a generator mode of operation during a prolonged downhill descent;

stopping flow of fuel to an inlet valve supplying the fuel to the gas turbine; and operating the first motor generator in a motor mode of operation to thereby drive the gas turbine so as to dissipate energy during the downhill descent.

These and other objects, features and advantages according to the present invention are provided by a method for controlling a shared processor control system for a power train of a hybrid electric vehicle operating responsive to operation of an accelerator pedal and a brake pedal and including a gas turbine powering a first motor-generator, a flywheel powering a second motor-generator, and a traction third motor-generator operatively coupled for selectively driving and being driven by vehicle wheels, each of the first, the second and the third motor-generators being commonly connected to a high voltage bus via respective rectifier-inverters controlled by a single controller, the method includes steps for:

operating of accelerator pedal to produce a substantially instantaneous increase in third motor-generator torque and, thus, an increased load on the bus from the traction motor to thereby produce a voltage drop;

initiating increased power output from the flywheel motor-generator in response to the voltage drop to hold up the bus voltage, thereby decreasing flywheel shaft speed; and producing a proportional increase in speed of the gas turbine in response to the decreasing shaft speed to thereby cause increased flow of fuel to the gas turbine so as to permit an increase in voltage provided by the first motor generator.

These and other objects, features and advantages of the present invention are disclosed in or apparent from the following description of preferred embodiments.

BRIEF DESCRIPTION OF THE DRAWINGS

The preferred embodiments are described with reference to the drawings, wherein like elements are denoted by like or similar numbers, and wherein:

FIG. 8a is a high level block diagram which is useful in understanding portion of the control system according to the present invention relating to turbine speed control while FIG. 8b illustrates an alternative representation of the turbine speed control loop;

FIGS. 10a, 10b, 10c and 10d depict curves similar to those shown in FIGS. 9a–9d, respectively, which are generally useful in understanding system behavior during stop and go driving;

FIGS. 11a, 11b, 11c and 11d depict curves similar to those shown in FIGS. 9a–9d, respectively, which are generally useful in understanding system behavior during hill climbing and descending;

DESCRIPTION OF THE PREFERRED EMBODIMENTS

Figure 1:
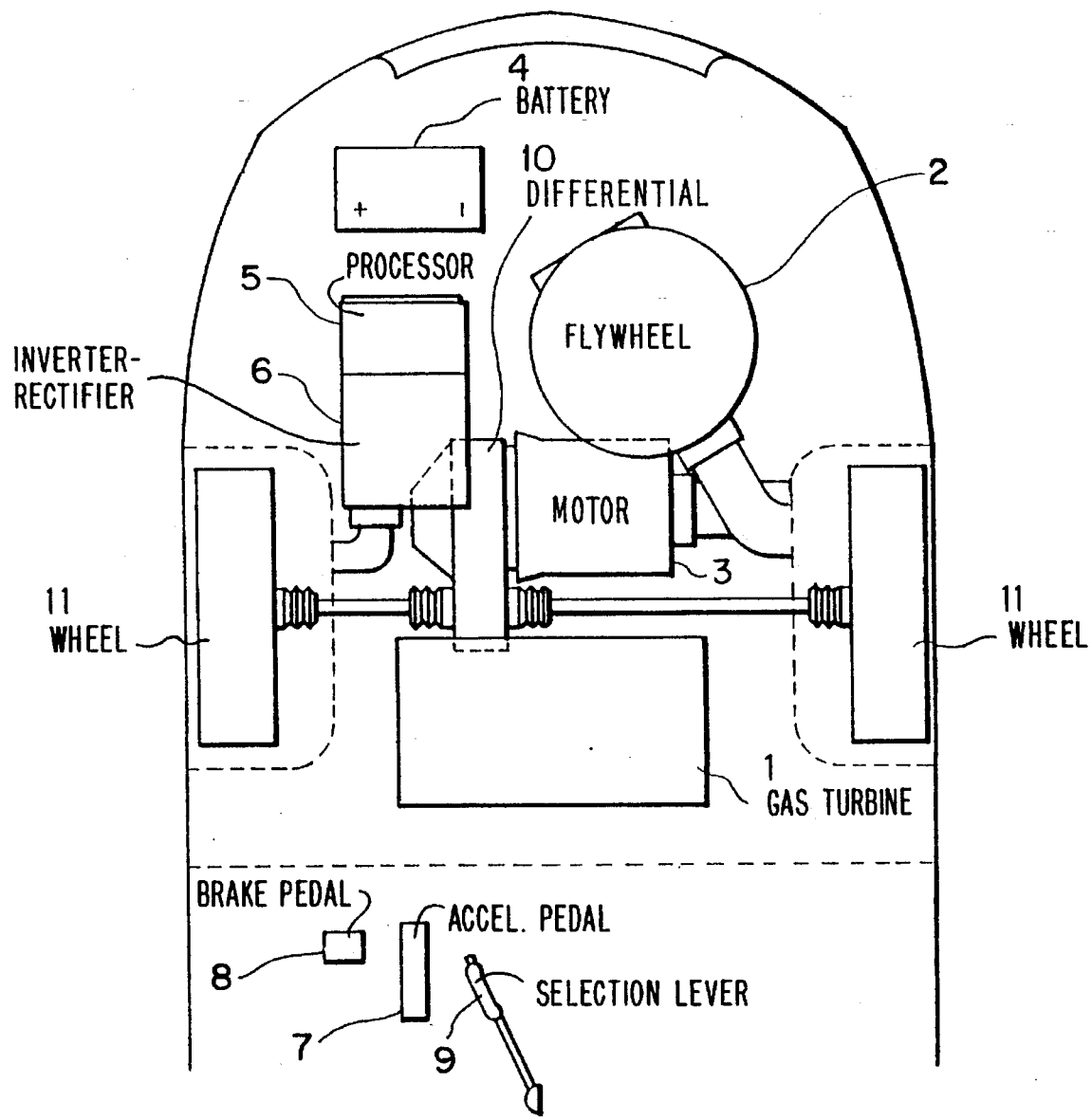
FIG. 1 shows the general arrangement of the components of the power train disposed in the front end of a hybrid/electrical vehicle according to the present invention.

The general arrangement of the components of the power train in FIG. 1 shows a gas turbine 1, a flywheel 2, a traction motor 3, a 12 volt battery 4, and a controller 5. Processor 5 contains the central processor, memory, input and output units, as described in greater detail below. The inverter-rectifier unit 6 contains high power electronic switch elements which control the power of the motor-generators and the battery. The accelerator pedal 7, the brake pedal 8, and the selection lever 9 provide the driver's input to the control system. The differential 10 and driven wheels 11 complete the components of power train.

The gas turbine 1 is preferably the NOMAC 24 KW model, which is described in a SAE paper by Robin Mackay for the SAE International Congress and Exposition, March, 1994, entitled "Development of a 24 KW Gas Turbine Generator Set for Hybrid Vehicles", which is incorporated herein by reference for all purposes. The paper describes a 24 KW turbine generator having a single moving part, i e., an air-bearing supported shaft containing the compressor wheel, turbine wheel, and the rotor of the motor-generator, which develops 24 kilowatts of power at a maximum turbine inlet temperature of 1500° F. and a maximum shaft speed of 96,000 RPM, i.e., 10000 radians per second. The motor-generator has a permanent magnet rotor which excites a two pole, three phase stator.

The flywheel 2 is preferably the Rosen Motors 2 KWH model, described in co-pending patent application Ser. Nos. 08/148,361, 08/181,038 and 08/199,897, which are incorporated herein by reference for all purposes. Flywheel 2 advantageously stores 2 kilowatt hours of energy at full charge and preferably can deliver 120 kilowatts of surge power. Preferably, the maximum rotor speed of flywheel 2 is 76,394 RPM, i.e., 8,000 radians per second, and the quiescent speed of the flywheel is 61,115 RPM, i.e., 6,400 radians per second. Advantageously, the motor-generator incorporated into the flywheel 2 can be a two pole, three phase, synchronous reluctance machine.

Traction motor 3 is preferably a 4 pole, three phase induction or synchronous reluctance motor capable of developing a maximum of 144 kilowatts of mechanical or electrical power while the 12 volt battery 4 is a conventional starter battery which is used to power the low voltage appliances on the vehicle.

Figure 2:
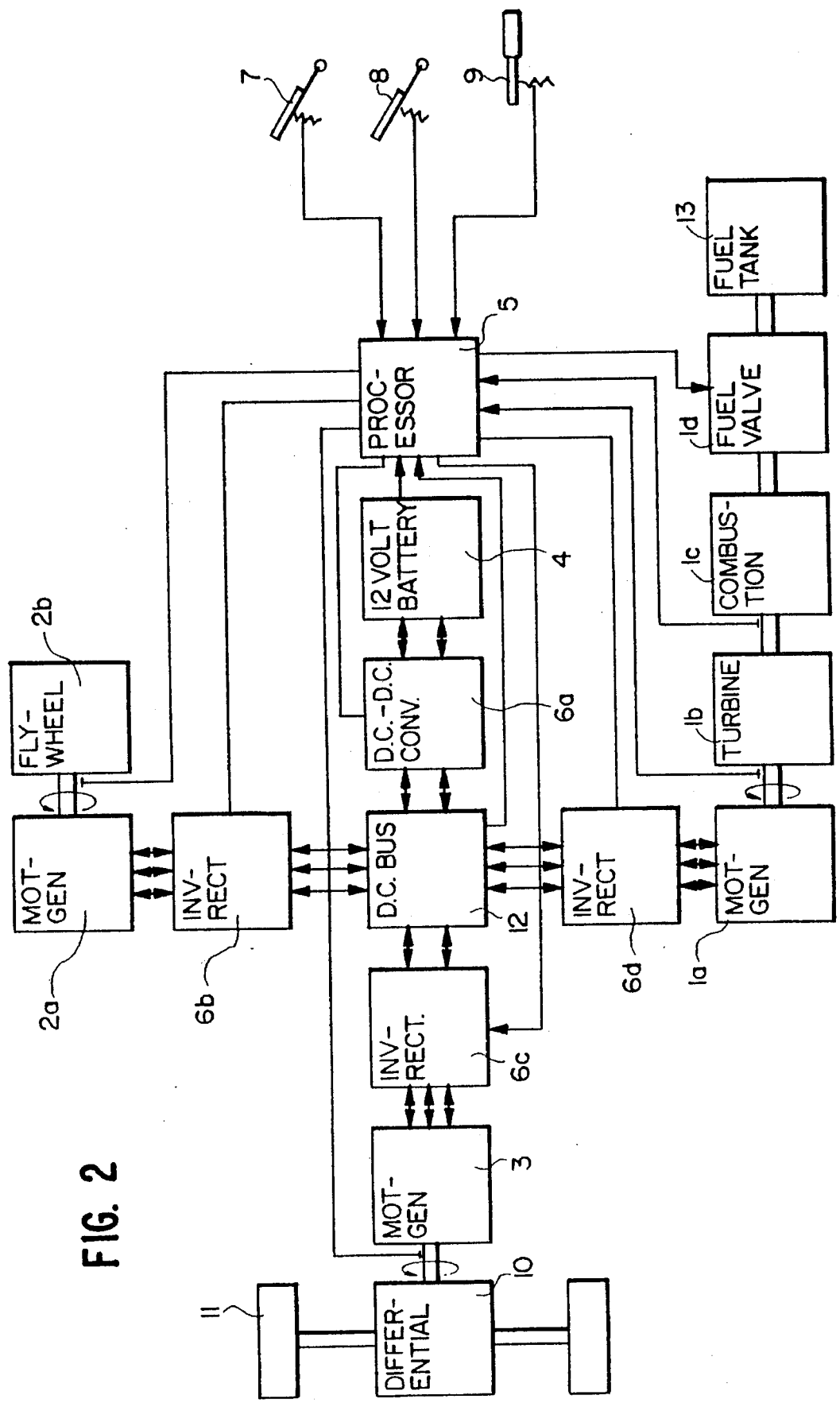
FIG. 2 is a high level block diagram of the power train which is useful in understanding the interrelation and operation of the shared control system according to the present invention.

FIG. 2 shows the arrangement of the mechanical and electronic elements of the power train. The torque delivered to the drive wheels by the traction motor depends on the positions of the accelerator pedal 7, the brake pedal 8 and the hand lever 9. The hand lever 9 has five positions: park, reverse, neutral, forward, and compression braking. The response of the vehicle to the accelerator position is similar to that of conventional vehicles with automatic transmissions, except for being smoother and quicker. It will be appreciated that the response can be tailored to user performance by suitable programming. The brake pedal 8 decelerates the vehicle by regenerative braking for the top half of its stroke, and by engaging the friction brakes for the bottom half of its stroke. Regenerative braking causes the kinetic energy of the vehicle to be stored in the flywheel 2 rather than being dissipated as heat, hence resulting in improved fuel economy. However, braking action is limited to the driven wheels. Friction brakes, which apply braking torque to all wheels, are advantageously available as a backup for these rare situations which require emergency stopping capability. It will be appreciated that the wear of the friction brakes is greatly reduced because the friction brakes are used infrequently.

Preferably, processor 5 accepts as inputs the driver controls as well as the shaft positions of the three motor-generators, the turbine inlet temperature, the voltage of the nominally 12 volt battery 4, and the voltage of high power, high voltage bus 12, which bus preferably operates at 600 volts. Processor 5 generates as outputs respective three phase waveforms for each of the inverter-rectifiers 6b, 6c, and 6d of the three motor-generators, control signals for the direct-current to direct current (D.C.-to-D.C) converter 6a which regulates the 12 volt battery 4, and a control signal for the fuel valve 1d, which valve regulates the flow of fuel from the fuel tank 13 to the combustor 1c of gas turbine 1.

Figure 3:
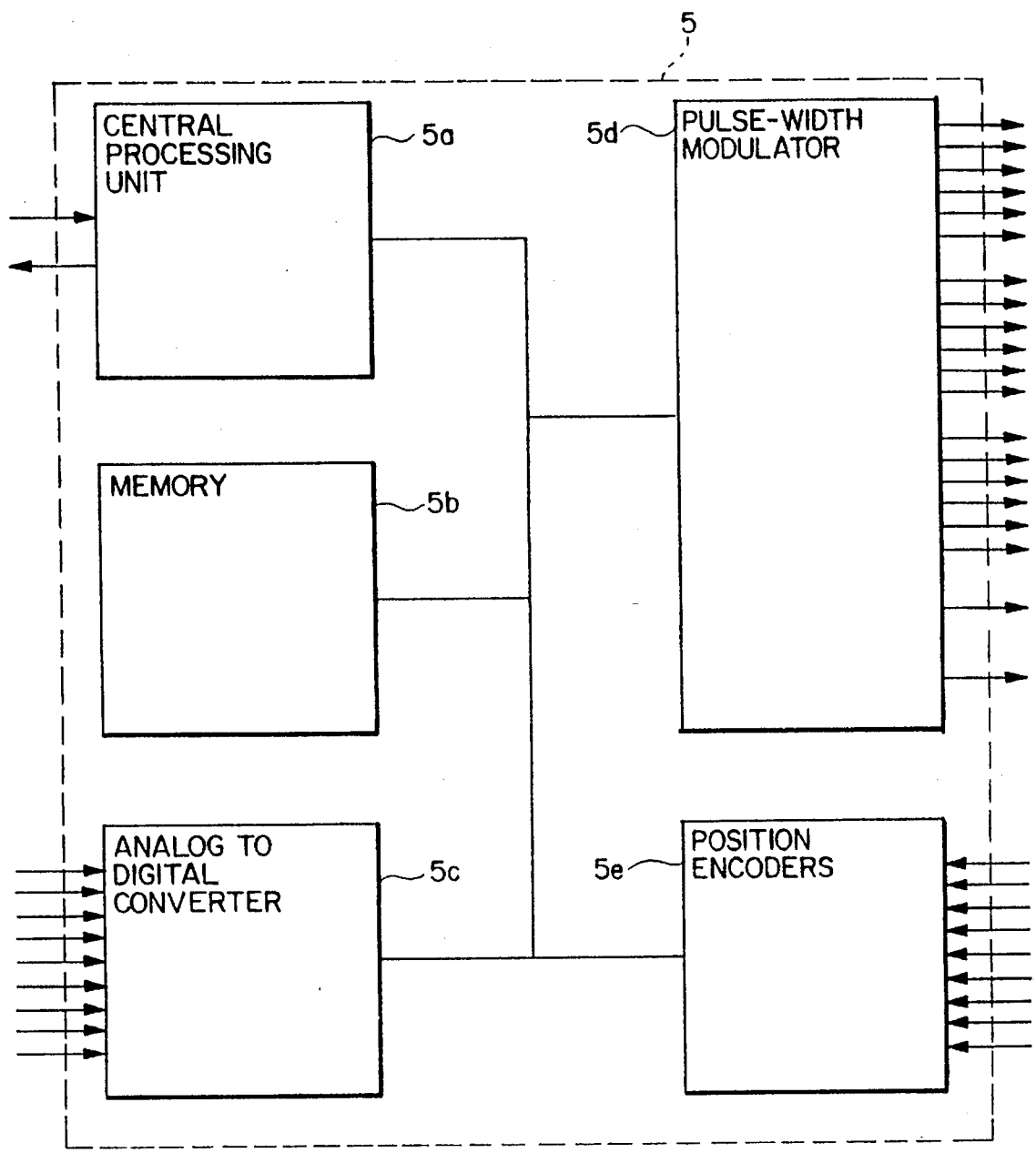
FIG. 3 is a block diagram of a processor employed in the control system illustrated in FIG. 2.

FIG. 3 shows the components of an exemplary processor 5 which consists of a high clock speed central processing unit 5a, e.g., CPU, such as the Motorola DSP56002, a memory bank 5b consisting of a 512K by 8 flash memory and 128K by 24 random access memory, an analog to digital conversion unit 5c containing 16 12-bit converters, a pulse width modulation unit 5d containing 12 bi-phase modulators, and a position encoder unit 5e which interfaces with respective sensors used to measure shaft position of units 1–3. The use of this high speed processor 5a advantageously allows the waveforms for all of the motor generators 1–3 to be generated by a single processor on a time shared basis.

Figure 4:
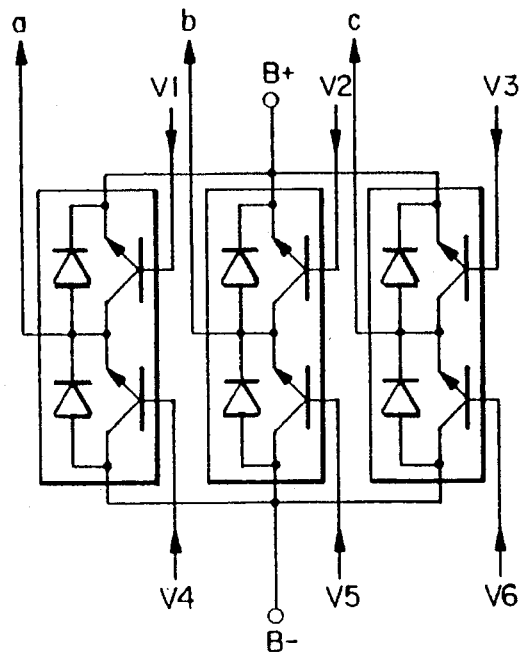
FIG. 4 is a schematic circuit diagram of an exemplary inverter-rectifier which advantageously can be employed in the power train shown in FIG. 2.

FIG. 4 shows the arrangement of transistors and diodes in one of the three inverter-rectifiers 6b, 6c and 6d contained in unit 6. The preferred transistor type at the present time for this high voltage, high current application is the insulated gate bipolar transistor, or IGBT. Packages containing two transistors and two flyback diodes mounted on an appropriate heat sink, as indicated by numeral 14, are commercially available from several manufacturers. One such package is required for each of the three phases of each inverter-rectifier. The pulse-width modulator 5d outputs V1 through V6 produce the three phase sinusoidal outputs Va, Vb, and Vc in the motor mode of operation, and rectification of the three phase signals charges the high voltage bus, indicated by B+, B−, in the generator mode of operation of the motor-generator.

FIG. 5a shows the exemplary interconnections between the processor 5, inverter-rectifier 6, and a motor-generator to develop current in the windings, using current feedback to establish a scale factor independent of rotational speed of the shaft, and shaft position feedback to permit optimum phasing of the currents. The current feedback enters the processor 5 via the analog to digital converter 5c, and the shaft position feedback, sensed preferably by Hall effect sensors, enters the processor 5 via the position encoder unit 5c. Although the three motor-generators all have similar three-phase stator windings, the rotors for the three applications advantageously may be of different types. Thus, the phase of the currents relative to respective shaft positions may differ slightly between the three applications, i.e., three different motor-generators, in order to optimize the efficiency and torque of each. Preferably, logic for accomplishing this optimized current control is stored in the memory 5b, and processed by the CPU 5a to generate the input signals applied to the PWM 5d. It will be appreciated that PWM 5 delivers the six high speed switching signals V1 through V6 needed to develop the waveforms in inverter-rectifier 6c for each motor-generator, of which motor-generator 3 is typical.

FIG. 5b shows in more detail the implementation of current control. The measured currents in lines a and b, i.e., 1a and 1b, are input to the transformation matrix 5f which converts three phase a.c. signals 120 degrees apart into two phase D.C. signals, 1d and 1q. These feedback signals 1d and 1q are subtracted from commanded input direct and quadrature currents 1d* and 1q*, and the error signals are input to shaping functions 5g and transformation matrix 5h. The output signals Va* and Vb* are output as properly phased and scaled inputs to the pulse width modulator 5d, whose six outputs control, e.g., the inverter-rectifier 6c. The shaft angle encoder 5j provides the shaft angle signal Qr used in both matrices 5f and 5h for performing their respective transformations.

Figure 12:
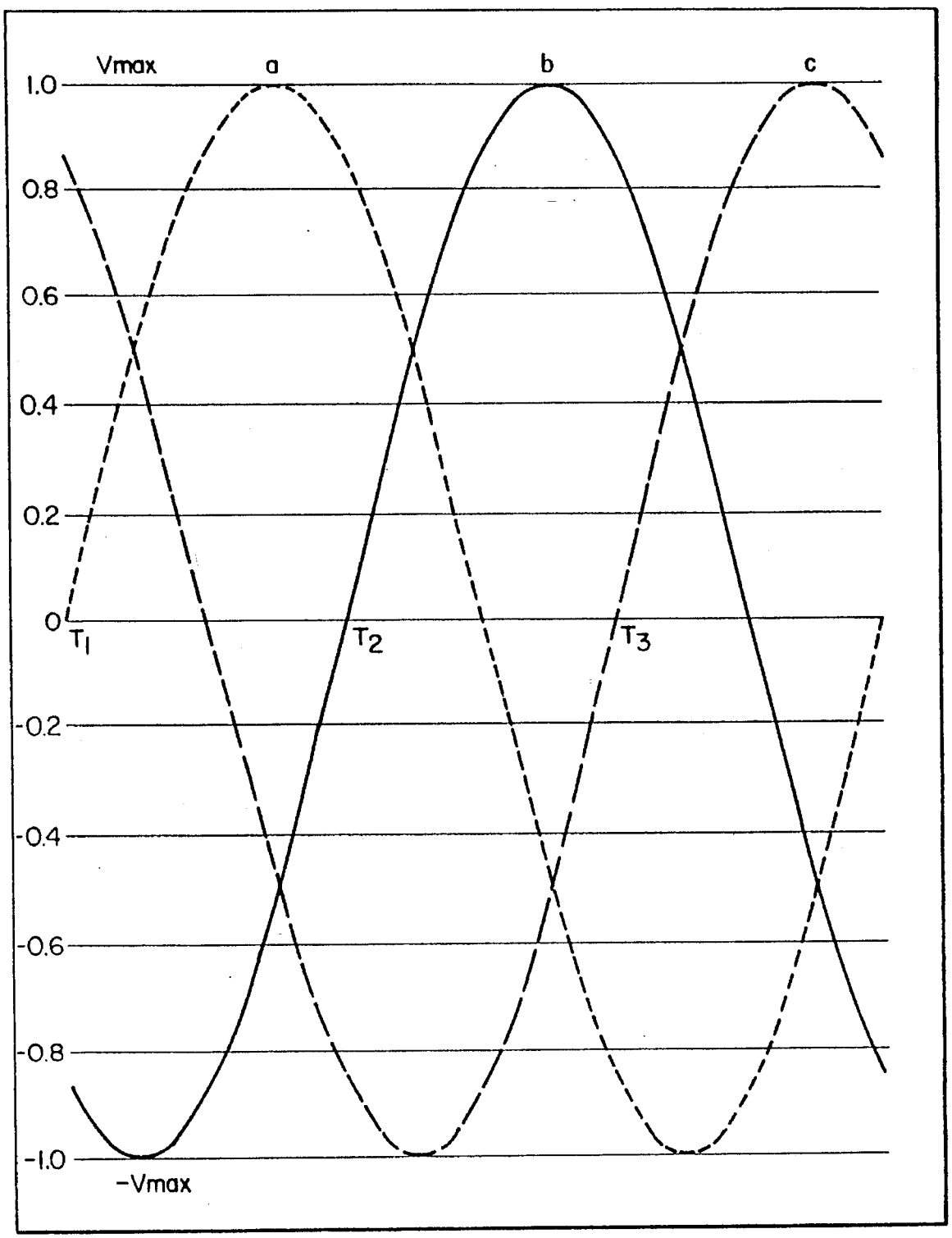
FIG. 12 is an illustration of three-phase waveforms which is useful in understanding the operation of controller 5 of FIG. 3.
Figure 13A:
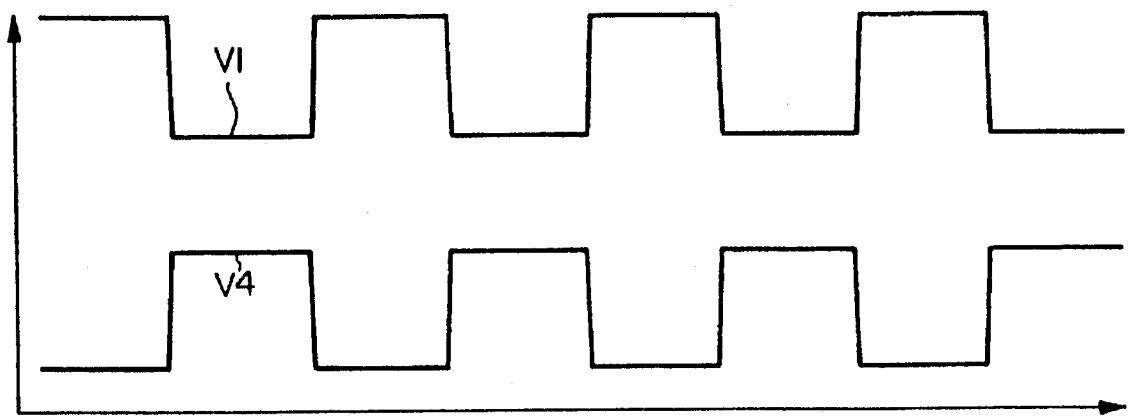
FIGS. 13, 14 and 15 are timing patterns for the output voltages V1 through V6 produced by the PWM unit 5d shown in FIG. 3.
Figure 13B:
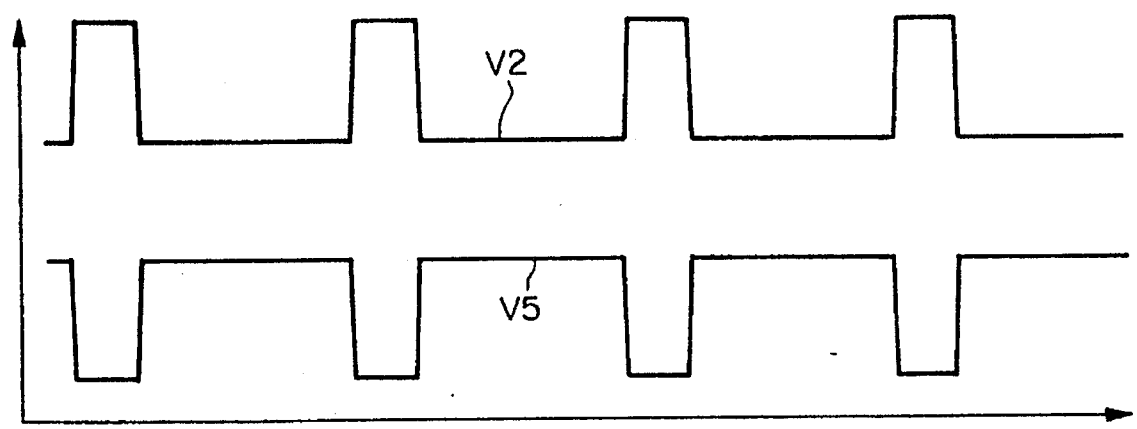
Figure 13C:
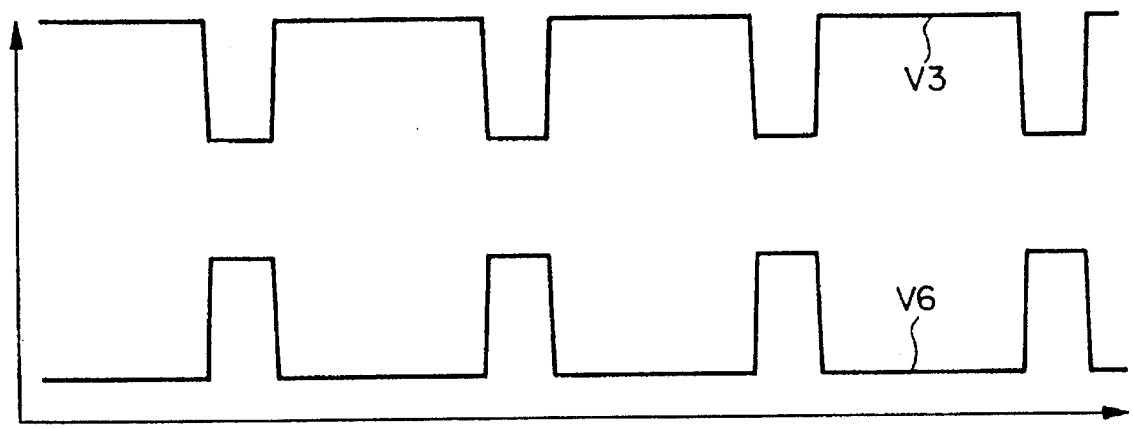
Figure 14A:
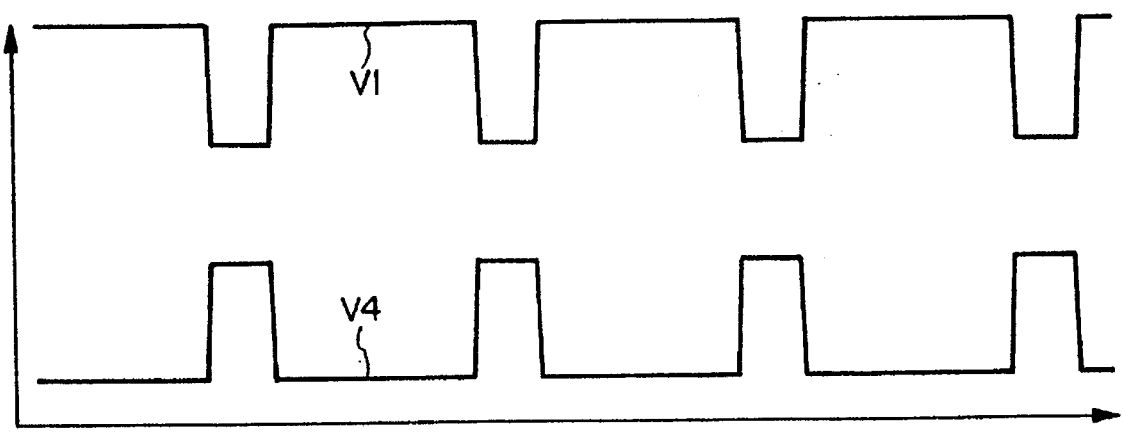
Figure 14B:
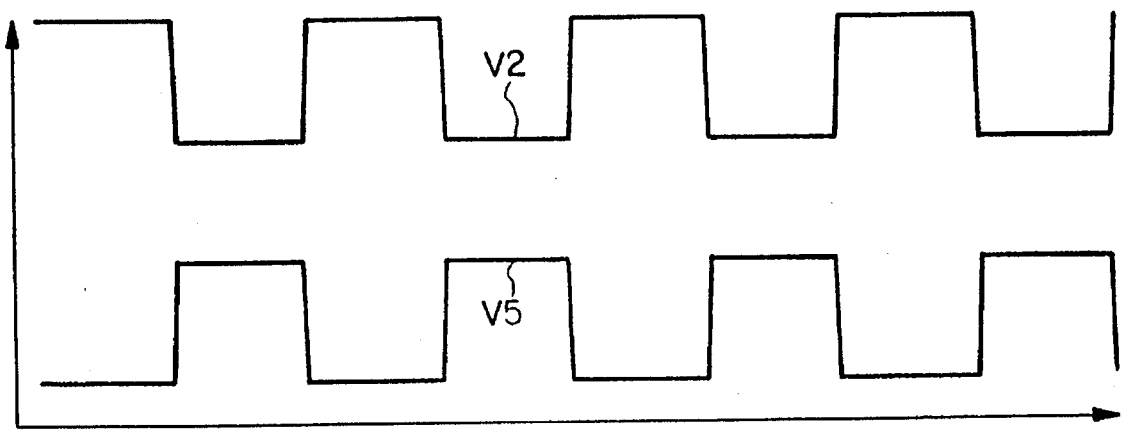
Figure 14C:
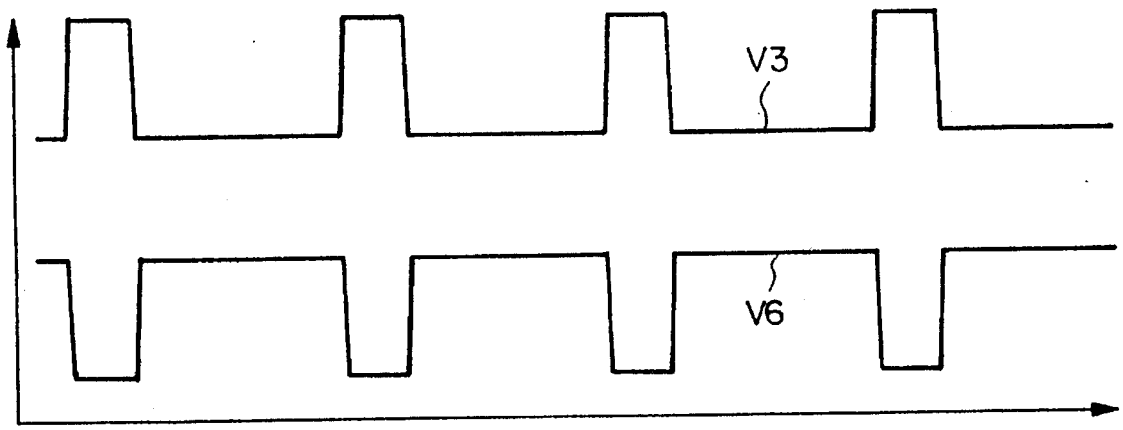
Figure 15A:
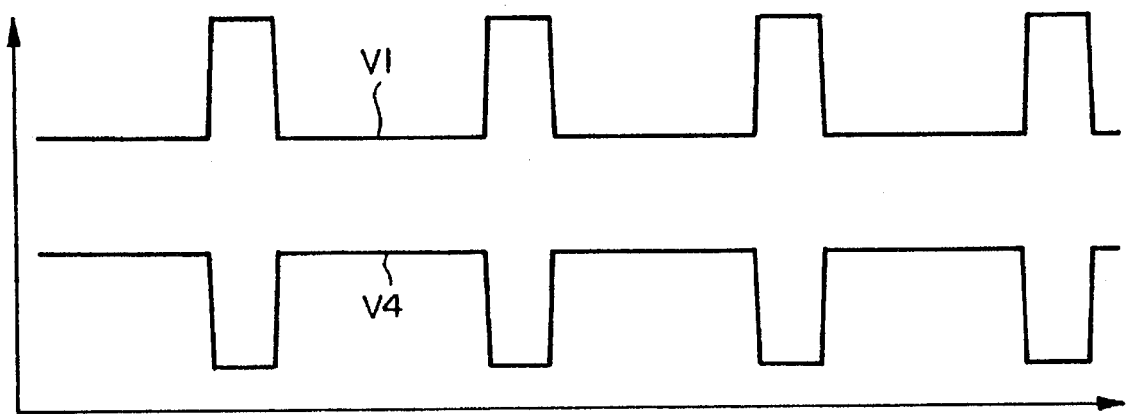
Figure 15B:
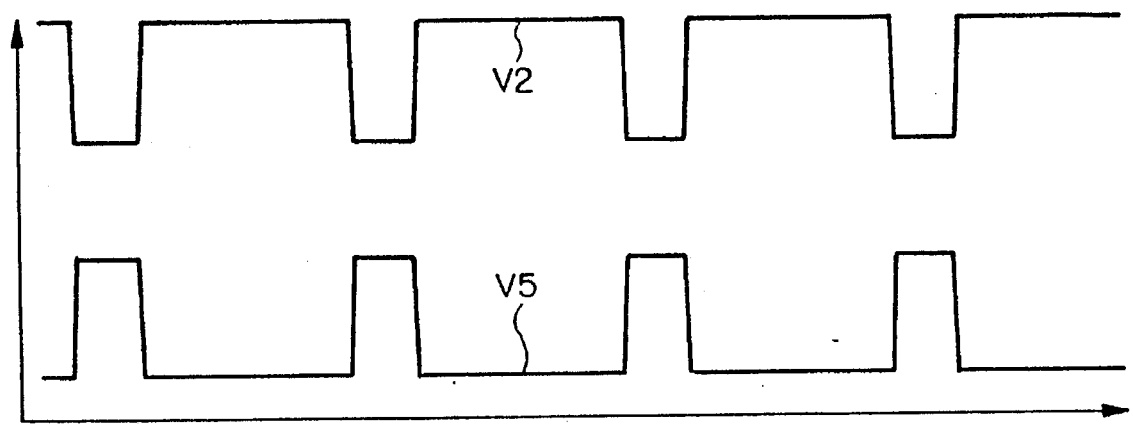
Figure 15C:
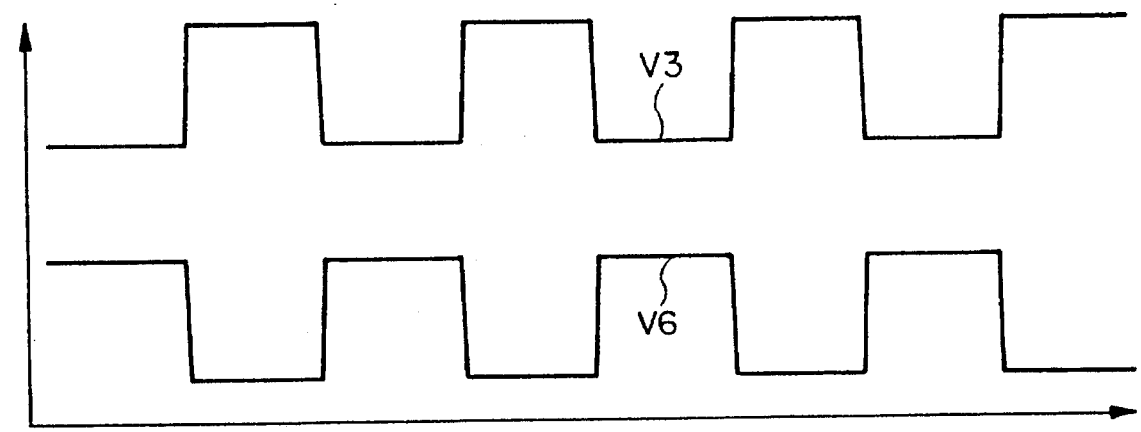
Figure 4:
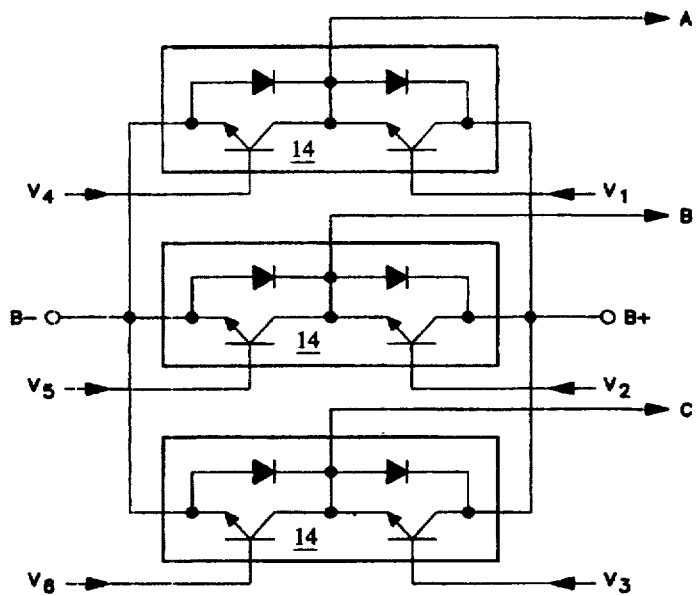
Figure 5:
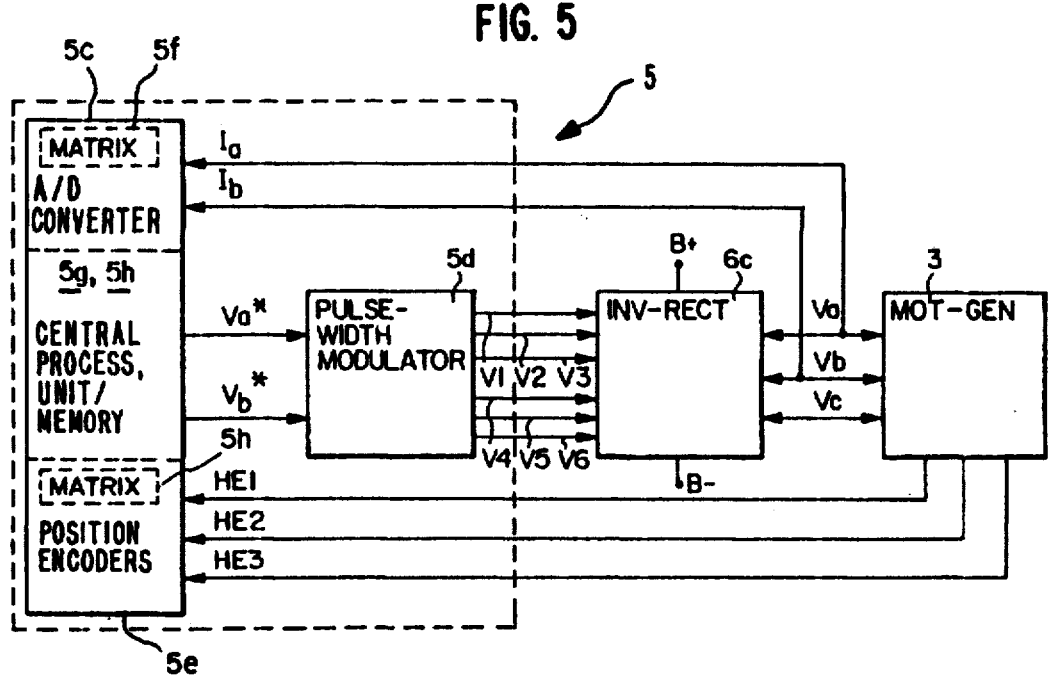

The timing for the six output voltages of PWM 5d, i.e., V1 through V6, which control the switching transistors of the respective inverter-rectifiers 6b, 6c and 6d, to generate the three-phase waveforms are shown in FIGS. 12–15. The three phase waveforms a, b, and c are shown in FIG. 12, with their times for ascending zero crossing T1, T2, and T3 indicated. FIG. 13 shows the switching times of V1–V6 which produce zero volts for waveform c, 0.866 Vmax for waveform a, and −0.866 Vmax for waveform b, at time T1. For each of the six control voltages V1 through V6, the upper state creates the ON state in the corresponding power transistor while the lower state creates switches the transistor OFF. It will be appreciated that FIG. 14 shows the control voltages for time T2 while FIG. 15 shows the control voltages for time T3.

The operation of the machines as either motors or generators can be explained as follows. The current in the stator can be resolved into two components. One component produces a magnetic field in the stator having the same direction as the magnetic field in the rotor. This current is called the direct component 1d. The other component of current produces a field perpendicular to the rotor field and is called the quadrature component, e.g., 1q. The direct component produces the magnetic field in the rotor and the quadrature component produces the torque. If the quadrature field is in the direction of rotation of the motor it will accelerate. This is the result of the voltage produced by the rotating magnetic field on the rotor called back emf. When the quadrature current is in the same direction as the back emf, energy is applied to the motor since the product of the current and voltage is positive. If the quadrature current is in the opposite direction, energy is removed from the motor and it becomes a generator. In this case the torque is opposite to the direction of rotation and the motor will decelerate. In all cases, the mechanical energy removed from or applied to the motor is equal to the electrical energy applied to or generated by the motor, neglecting any electrical or mechanical losses.

Figure 6:
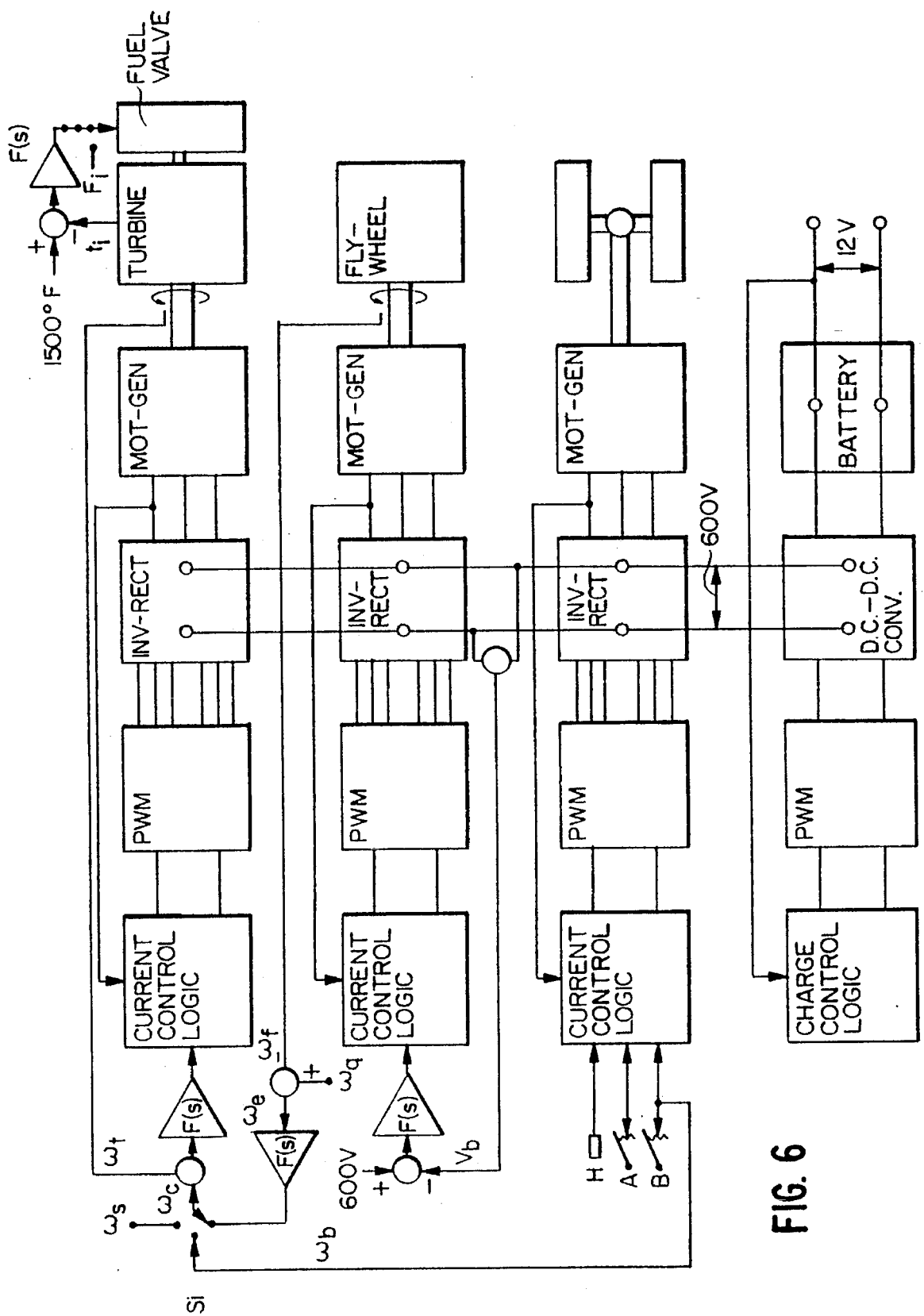
FIG. 6 is a more detailed high level block diagram of the power train control system according to the present invention which is helpful in understanding the interrelation and location of multiple system control loops.

The overall control system for the power train is illustrated in the block diagram of FIG. 6, which consists of several interrelated control loops. Each feedback loop contains a transfer function F(s), s being the LaPlace operator, having the form $1+T_1s/T_2s$. This operation, indicated symbolically in FIG. 6 as a triangle in the signal path, consists of an integration and a lead term whose time constants are selected for the individual loops to yield the desired transient response. The integration term advantageously results in zero steady state error, while the lead term provides the desired stability margin.

The high voltage bus 12, to which all of the motor-generators are connected via inverter-rectifiers, and to which the 12 volt battery 4 is connected via a bi-directional D.C.-to-D.C. converter 61, is maintained at its nominal voltage of 600 volts by the fast feedback of the flywheel motor-generator 2 control circuit. The choice of 600 volts, twice the voltage of typical electro-chemical battery powered vehicles, minimizes the current and hence the heat dissipation of the inverter rectifiers 6b, 6c and 6d. The difference between a 600 volt reference and the actual bus voltage Vb is sensed and operated on by the transfer function to control the flywheel motor-generator current. The current control system, previously described with respect to FIG. 5, adds current to the bus 12 to increase bus voltage or subtracts current from the bus to decrease bus voltage. This action of the respective current feedback loop, which has a response time on the order of a few milliseconds and zero steady state error, results in good regulation despite transient loads. The motor-generator current slows down or speeds up the flywheel 2, depending on whether energy is being added to or subtracted from the bus 12. The flywheel speed, and hence its energy or state of charge, must be separately controlled toward the flywheel's desired quiescent value. This function is accomplished by the action of the turbine control loop.

The gas turbine 1, through its motor-generator provides the average power demand of the vehicle. This power demand is primarily a function of the driving mode, e.g., urban or highway, but also includes secondary loads, e.g., air conditioning. Preferably, the power delivered ranges between nearly zero and 24 KW for all cases except for compressive braking during long descents, described in greater detail below, where gas turbine 1 may be called upon to absorb as much as 24 KW. The turbine control consists of a turbine inlet temperature control loop and a shaft speed control loop. The thermal efficiency of the gas turbine 1 advantageously is highest when the inlet temperature is its maximum permissible, 1500° F. The temperature control loop, whose response time is as short as the inherent loop delays preferably permits adjustment of the fuel control valve 1c to null the difference between the actual temperature Ti and 1500° F., thus maintaining this optimum temperature for all shaft speeds.

Figure 7:
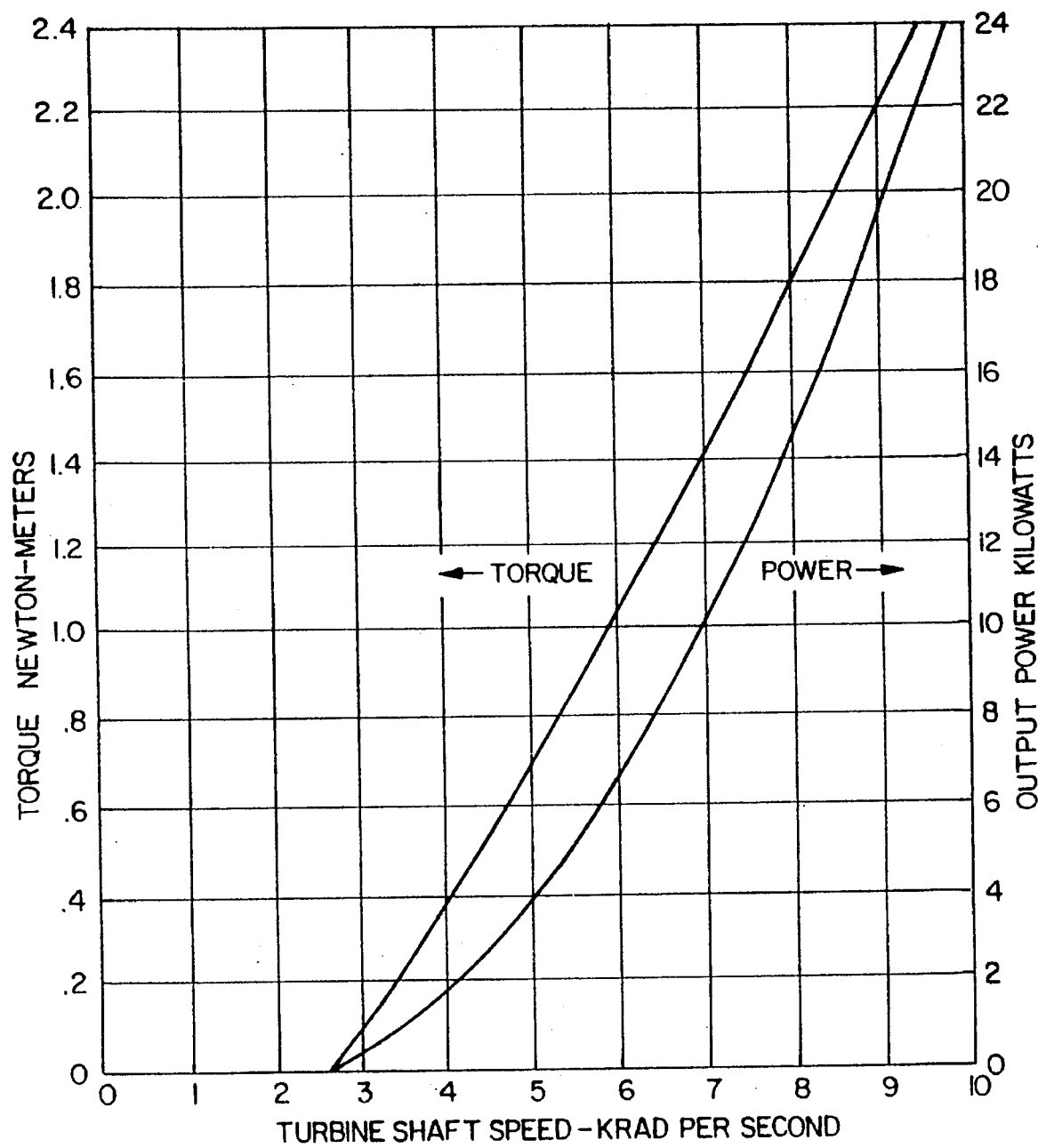
FIG. 7 illustrates performance curves of the turbine power and torque characteristics variation with respect to shaft speed.
Figure 9A:
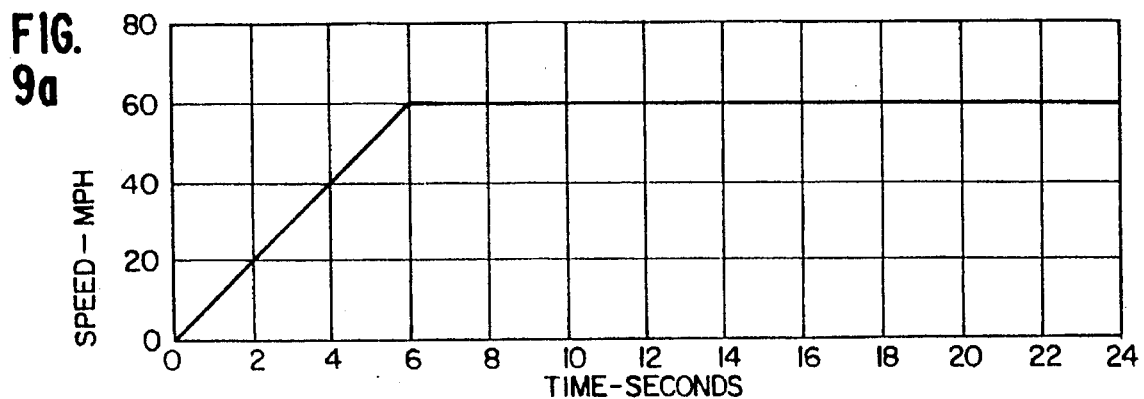
FIGS. 9a, 9b, 9c and 9d depict characteristic curves for vehicle speed, flywheel radial speed, turbine radial speed and power sharing, respectively, during the during acceleration according to the present invention.
Figure 9B:
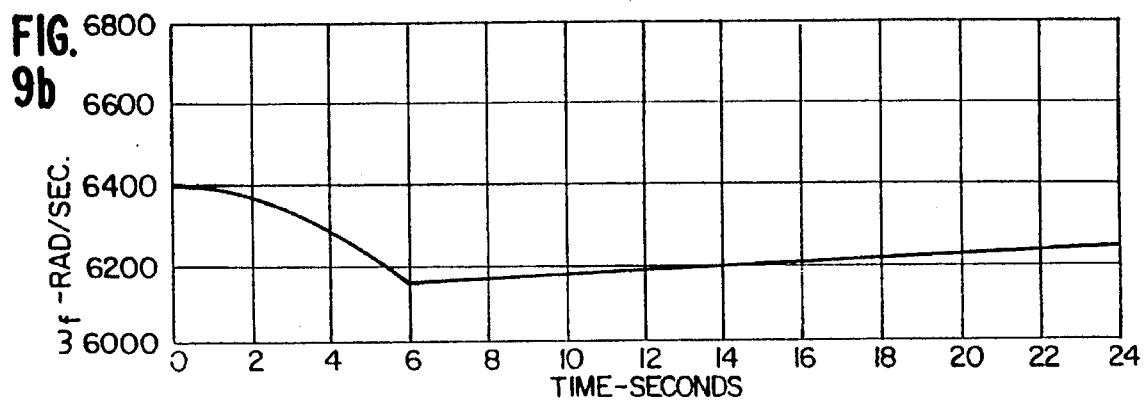
Figure 9C:
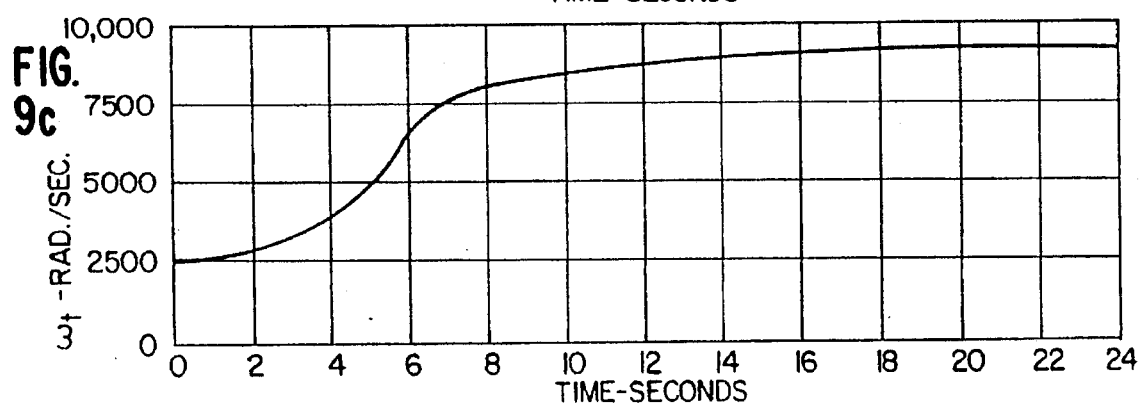
Figure 9D:
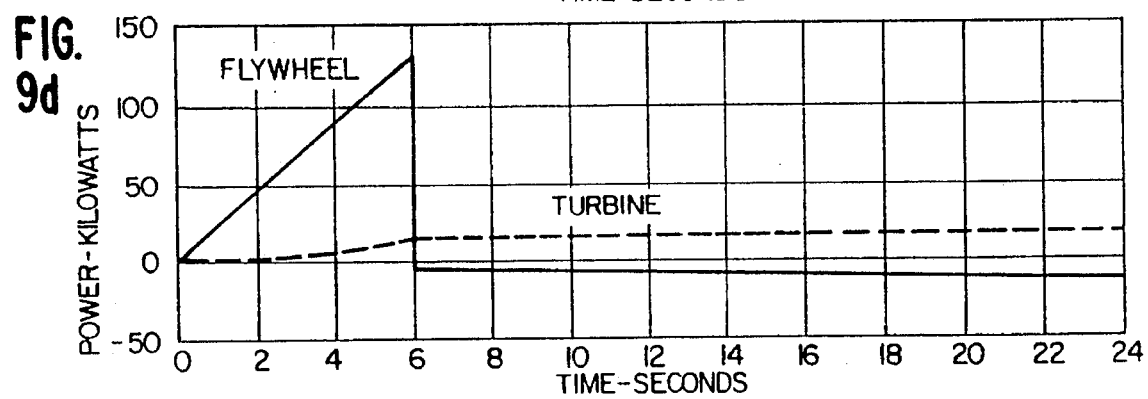

The gas turbine's power output and torque are monotonically increasing functions of the shaft speed for a constant inlet temperature. This is shown in FIG. 7, in which the curves for the NOMAC 24 KW machine are plotted. The slope of the power output versus shaft speed curve at a cruise power of 10 KW is approximately 4 watts per radian per second, and the corresponding torque slope Kt is approximately 3.75×10−4 newton meters per radian per second. The shaft speed is controlled by adjusting the current in the respective motor-generator, to provide the desired output power. Preferably, a shaft speed control loop nulls the difference between the turbine shaft speed $\omega_t$ and the commanded value, $\omega_c$, as shown both in FIG. 6 and, in more detail, in FIGS. 8a and 8b. These Figures show the positive feedback path presented by Kt, the derivative of turbine torque Lt with respect to turbine shaft speed, the negative feedback path presented by Ki, the motor-generator torque Lm per unit current, and the negative feedback of the turbine shaft speed $\omega_t$ to the input to the digital controller. This loop is stabilized by the shaping function F, $k1+T1s/T2s$, where k is a constant having dimensions of amperes per radian per second. Table 1 lists the values of the constants which result in critical damping for a variety of response speeds indicated by the undamped resonant frequency $\omega_o$.

TABLE 1

| $\backslash-\omega_0-\dfrac{\text{radians}}{\text{seconds}}\backslash\sim$ | $T_1$ − seconds | $\backslash-\dfrac{K}{T_2}-\dfrac{\text{amperes}}{\text{radians}}\backslash\sim$ |
|---|---|---|
| 1 | 2.5 | .0125 |
| 2 | 1.125 | .050 |
| 3.16 | 0.68 | .125 |

It should be noted that $l=7.5\times10^{-4}$ Kg m$^2$, $K_T=3.75\times10^{-4}$ nm/rad/sec, $K_i=6.0\times10^{-2}$ nm/amp and $F(s)=K(1+T_1s)/T_2s$.

The commanded value of gas turbine 1's shaft speed during normal driving is a scaled integral of the difference between the flywheel shaft speed $\omega_f$ and the shaft speed's quiescent value $\omega_q$. Preferably, the response time to this input is made long to cause the gas turbine 1 to follow the average rather than the instantaneous power demand. This combination of two feedback loops advantageously causes the turbine motor-generator to produce the average power demand of the vehicle at the highest possible turbine efficiency.

The traction motor 3 is controlled by three driver inputs, i.e., the hand lever 9 which selects forward, reverse, or compressive braking, the accelerator pedal 7, and the brake pedal 8. Motor currents, hence torque, of the proper magnitude and sign are then produced by the current control logic previously described.

The flow of action during normal driving is as follows. In response to a depression of the accelerator pedal 7, current is supplied to the traction motor 3 which immediately generates torque, which is coupled to the driven wheels 11 via the fixed gear reduction and the differential 10, accelerating the vehicle. The current drain momentarily lowers the bus 12 voltage, causing the flywheel generator 2 to add current to the bus, thus reestablishing and maintaining the o voltage at 600 volts while flywheel generator 2's rotational speed decreases. The energy for this initial motion, i.e., vehicle acceleration, is, thus, supplied by the flywheel 2. The turbine speed control loop responds to the reduced flywheel speed by causing the gas turbine 1 to speed up. The increased air flow through the turbine momentarily cools the turbine, causing the turbine inlet temperature control loop to increase the fuel flow in order to maintain and restore the inlet temperature of gas turbine 1 to a predetermined value.

It is this indirect sequence of events which increases the fuel flow in response to the accelerator 7 depression, in contrast to the direct path from pedal depression to fuel flow characteristic of conventional internal combustion engines. The increased turbine power which results from its increased fuel flow and its higher shaft speed causes the gas turbine 1 generator to increase the power supplied to the bus 12, thus tending to raise the bus voltage. The flywheel speed control loop responds by speeding up flywheel speed, restoring the flywheel toward quiescent value of the flywheel shaft, i.e., $\omega_q$.

The shaft speed histories of the flywheel 2 and the gas turbine 1 and the power supplied by each during acceleration from a standing start to 60 MPH and a subsequent constant speed cruise at 60 MPH are shown in FIGS. 9a, 9b, 9c and 9d. These Figures cooperatively show how the flywheel 2 supplies most of the power during initial acceleration, with the gas turbine 1 providing all of the drive power during constant velocity cruising, as well as all of the power needed for recharging the flywheel 2. In this example, the initial turbine shaft speed is 2500 radians per second, the idle value. This speed was also chosen as the starting condition for the extreme stop and go driving cycle shown in FIGS. 10a, 10b, 10c and 10d. This later example illustrates the exchange of energy between the flywheel 2 and the vehicle during accelerating and braking, with the gas turbine 1 supplying a relatively small amount of the power required because of the low average speed of the vehicle. In both examples, the gas turbine 1 recharges the flywheel 2 rather quickly. It will be appreciated that a slower response characteristic would keep the turbine speed closer to its average value.

Two additional shaft speed modes of operation for the gas turbine 1 may be selected by the shaft speed control loop input switch Si as shown in FIG. 6. In the starting sequence, a relatively low programmed speed $\omega_s$, which permits safe, smooth starting, is used. Alternatively, in the compression braking mode, described below, the shaft speed is determined by the brake pedal position, scaled as $\omega_b$.

Although the combination of regenerative and friction braking is adequate for ordinary driving conditions and emergency stops, the braking demands of long downhill grades may exceed braking capacities. Under such conditions in internal combustion vehicles, downshifting to create high compression losses in the engine is employed to keep the friction brakes from fading. An analogous process, which converts mechanical energy of the vehicle into heat energy in the turbine air stream is provided by this control system. Preferably, it is initiated by selecting the compression braking mode with hand lever 9. This causes the fuel flow to the gas turbine 1 to revert to idle flow Fl, and the speed control loop of the gas turbine 1 to adjust to a high speed which is determined by the brake pedal position, e.g., the more brake depression, the higher the turbine shaft speed $\omega_t$, which increases the amount of motor power required to turn the turbine shaft and, thus, increases the braking torque of the traction motor-generator 3 operating in a generator mode. This mode of operation gives smooth, continuous control of downhill braking in response to the brake pedal 8 depression.

An example of the use of this mode is shown in by the exemplary curves of FIGS. 11a, 11b, 11c and 11d, which illustrate the use of power generation and absorption in hill climbing and descending. As the vehicle starts the climb up a typical 6% grade, the gas turbine 1 delivers its maximum power of 24 KW, and is augmented by 5 KW delivered by the flywheel 2. The combined power of 29 KW is sufficient to maintain a speed of 60 MPH using traction motor 3. Ten minutes into the drive, the crest is reached and a long, slow descent begins.

During the first 5.5 minutes of the descent, regenerative braking recharges the flywheel 2 to its quiescent value $\omega_q$, after which compression braking is employed for the rest of the descent which lasts another 4.5 minutes. During this phase of operation, the turbine speed control, responding to brake pedal 8 depression, establishes a turbine speed of 7500 radians per second. With the fuel throttled back to idle, the gas turbine 1 absorbs the energy developed by the traction motor-generator 3 operating in generator mode, thereby saving wear on the friction brakes.

The 12 volt battery 4, which is used to supply the usual low voltage loads associated with most vehicle 5, is charged from the 600 volt bus, using a D.C.-to-D.C. converter 6a under the control of logic acting on its pulse-width modulator 5d. In the event the flywheel 2 is allowed to run down, e.g., after long storage without recharge, the 12 volt battery 4 can advantageously be used to start the gas turbine 1. Two types of combustor may be used by the gas turbine 1. With a conventional combustor, the starting power demands of the turbine are low enough for the 12 volt battery 4 to start the gas turbine 1 directly, by charging the 600 volt bus. The gas turbine 1 then undergoes its normal start sequence, after which it is available to recharge the flywheel 2 to its quiescent value.

When a catalytic combustor is used, a high power heater 1e in the combustor 1c must be energized for a few seconds in order to start the combustion process. Even though the energy required by the start sequence is quite small, i.e., because of its short duration, the power demand is beyond the capability of battery 4. Therefore, the starting sequence must proceed in two stages. First, the battery 4 charges the flywheel 2 to approximately one tenth of its capacity. The flywheel 2, which advantageously has more than adequate power capability, then provides the starting power for the gas turbine 1, which then charges the flywheel 2 to its quiescent value $\omega_q$. The 12 volt battery 4 cannot charge the flywheel 2 directly to its quiescent value because of its relatively low energy content.

During all of these driving conditions, the only driver inputs required are from the conventional foot pedals, except for compression braking selection. During all modes of operation, the control system automatically controls the flywheel 2, gas turbine 1, and traction motor-generator 3.

The respective motor-generators are connected to the gas turbine 1, the flywheel 2, and the driven wheels of the vehicle, which all operate at generally different speeds. All motor-generators are three phase a.c. machines which must be supplied with waveforms having the appropriate frequency and voltage as well as freedom from excessive harmonics. In addition, the 12 volt battery 4, which supplies the low voltage loads of the vehicle, must be provided with a charge and discharge D.C.-to-D.C. converter. Preferably, these waveforms are synthesized in a single, high-speed time-shared signal processor 5. The transistors and diodes of the high power inverter/rectifiers, generally denoted 6, advantageously share a common, air cooled housing.

Average power demands are supplied to the vehicle by the motor-generator driven by gas turbine 1. The gas turbine 1 is controlled in response to speed and inlet temperature, which temperature corresponds to gas turbine 1's highest efficiency for the particular power demand, using speed and temperature feedback loops. The flywheel motor-generator 2 controls the common bus voltage to its nominal value with a fast feedback circuit. The flywheel 2 is controlled to quiescent speed $\omega_q$ by a relatively slow adjustment of the power delivered to the bus by the motor-generator of gas turbine 1. The accelerator pedal 7 controls the torque delivered by the traction motor 3 to the driven wheels 11. The brake pedal 8 controls the amount of braking torque developed by the traction motor 3 and by the friction brakes. A five position selection lever 9 selects between park, reverse, neutral, forward, and compression braking. The latter mode, which involves electrically driving the gas turbine 1 at high speed with the fuel inlet valve 1c in the idle position, is needed to dissipate energy during long descents in which the potential energy lost exceeds the capacity of the flywheel 2 to absorb and the friction brakes to dissipate.

The use of a gas turbine driven motor-generator 1 to satisfy the relatively-low average power demands and a flywheel driven motor-generator 2 to satisfy the peak power demands of the motor vehicle advantageously yields a power train performance far superior to that of the internal combustion engine, mechanical transmission power train presently in general use. Substantial improvements in fuel economy, pollution, acceleration capability and reliability are all advantageously provided. Because of the relatively large number of functions which must be performed by respective electronic controls, however, these controls must be effected in a manner which minimizes cost in order for this new system to be cost competitive.

Other modifications and variations to the invention will be apparent to those skilled in the art from the foregoing disclosure and teachings. For example, it will be appreciated that the operational characteristics of the turbine 1, the flywheel 2 and the traction motor 3 are all established by stored values in memory 5b of controller 5. Advantageously, any number of operational characteristics can be stored in memory 5b, thereby allowing the user to select the individual operational characteristic which matches the user's temperament and abilities.

Thus, while only certain embodiments of the invention have been specifically described herein, it will be apparent that numerous modifications may be made thereto without departing from the spirit and scope of the invention.

What is claimed is:

1. A shared processor control system for a power train of a hybrid electric vehicle operating responsive to operation of an accelerator pedal and a brake pedal and including a gas turbine powering a first motor-generator, a flywheel powering a second motor-generator, and a traction third motor-generator operatively coupled for selectively driving and being driven by vehicle wheels, each of said first, said second and said third motor-generators being commonly connected to a high voltage bus via respective rectifier-inverters controlled by a single controller, said control system characterized in that operation of said accelerator pedal produces substantially instantaneous torque from said third motor-generator applied to an output shaft with proportional increased load on said bus from said traction motor thereby producing a voltage drop, said voltage drop initiating increased power output from said flywheel motor-generator to hold up said bus voltage, thereby decreasing flywheel shaft speed, said decreasing shaft speed producing a proportional increase in speed of said gas turbine to thereby cause increased flow of fuel to the gas turbine and to permit an increase in voltage provided by said first motor generator.

2. The shared processor control system as recited in claim 1, wherein said controller receives a selected one of a predetermined starting speed signal and a variable compression braking control signal generated responsive to position of said brake pedal.

3. The shared processor control system as recited in claim 2, wherein said controller receives said compression braking control signal generated responsive to position of said brake pedal for generating a turbine control signal permitting regulation of associated gas turbine speed.

4. The shared processor control system as recited in claim 1, wherein a battery is electrically coupled to the high voltage bus by a D.C.-to-D.C. converter.

5. The shared processor control system as recited in claim 1, wherein said controller forms a portion of a high speed feedback loop controlling said flywheel motor-generator and a portion of a low speed feedback loop controlling said turbine motor-generator, wherein a first delay time associated with high speed feedback loop is smaller that a second delay time associated with said low speed feedback loop.

6. The shared processor control system as recited in claim 1, wherein current provided between each of said first, said second and said third motor-generators and a respective inverter-rectifier is controlled in response to an associated control signal representing current flowing between respective motor-generator, inverter-rectifier pair.

7. The shared processor control system as recited in claim 1, wherein said controller includes a pulse width modulator controlling said inverter-rectifiers on a time-shared basis.

8. The shared processor control system as recited in claim 1, wherein said controller includes means for determining shaft positions of said gas turbine and said flywheel so as to permit phase control of three-phase alternating voltages provided to said respective motor-generators.

9. A method for starting a gas turbine having a catalytic combustor requiring preheating included in a power train of a hybrid electric vehicle incorporating the gas turbine powering a first motor-generator, a flywheel powering a second motor-generator, and a traction third motor-generator operatively coupled for selectively driving and being driven by vehicle wheels in the event that the flywheel speed is allowed to decay to approximately zero revolutions per minute, said method comprising the steps of:

charging a direct current high voltage bus from a battery;

rotating said flywheel using said second motor generator operating in a motor mode of operation powered from said high voltage so as to convert said direct current to stored energy;

operating said second motor generator in a generator mode of operation so as to provide an energy surge suitable for powering a catalytic heater associated with said catalytic combustor; and igniting fuel supplied to said gas turbine through a fuel control valve.

10. A method of compressively braking a power train of a hybrid electric vehicle including a gas turbine powering a first motor-generator, a flywheel powering a second motor-generator, and a traction third motor-generator operatively coupled for selectively driving and being driven by vehicle wheels, said method comprising the steps of:

selectively operating said third motor-generator in a generator mode of operation in a prolonged downhill descent mode of operation;

stopping flow of fuel to an inlet valve supplying said fuel to said gas turbine; and operating said first motor generator in a motor mode of operation to thereby drive said gas turbine so as to dissipate energy during said downhill descent.

11. The method for controlling a shared processor control system for a power train of a hybrid electric vehicle operating responsive to operation of an accelerator pedal and a brake pedal and including a gas turbine powering a first motor-generator, a flywheel powering a second motor-generator, and a traction third motor-generator operatively coupled for selectively driving and being driven by vehicle wheels, each of the first, the second and the third motor-generators being commonly connected to a high voltage bus via respective rectifier-inverters controlled by a single controller, said method comprising steps for:

operating of accelerator pedal to produce an increased load on the bus by the traction motor to thereby produce a voltage drop;

initiating increased power output from the flywheel motor-generator in response to the voltage drop to hold up the bus voltage, thereby decreasing flywheel shaft speed; and producing a proportional increase in speed of the gas turbine in response to the decreasing shaft speed to thereby cause increased flow of fuel to the gas turbine so as to permit an increase in voltage provided by the first motor generator.

* * * * *

UNITED STATES PATENT AND TRADEMARK OFFICE
CERTIFICATE OF CORRECTION

Page 1 of 10

PATENT NO. : 5,568,023

DATED : Oct. 22, 1996

INVENTOR(S) : Grayer et al

Figure 5:
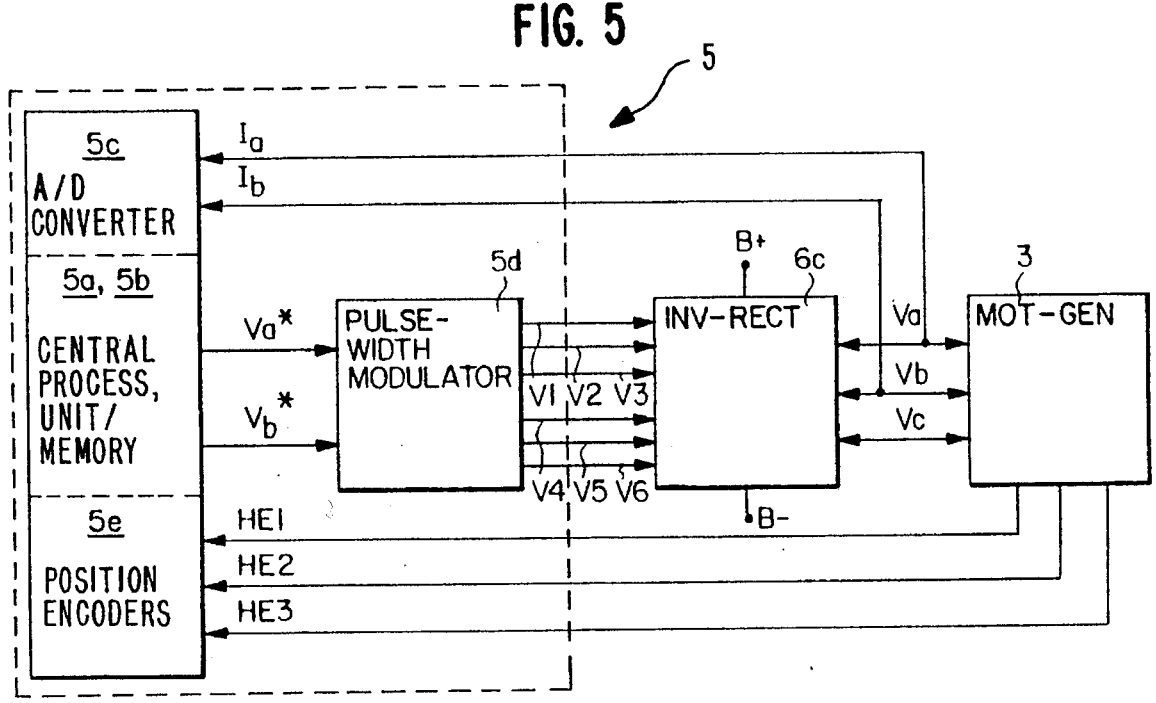
FIG. 5 is a high level block diagram of a motor control loop which is useful in understanding the control and operation of the power train illustrated in FIG. 2.

It is certified that error appears in the above-identified patent and that said Letters Patent is hereby corrected as shown below:

In the Drawings Sheet 4, consisting of FIGS. 4 and 5, should be deleted to be replaced with the corrected FIGS. 4 and 5, as shown on the attached page.

UNITED STATES PATENT AND TRADEMARK OFFICE
CERTIFICATE OF CORRECTION

PATENT NO. : 5,568,023
DATED : Oct. 22, 1996
INVENTOR(S) : Grayer et al.

It is certified that errors appear in the above-identified patent and that said Letters Patent is hereby corrected as shown below:

Column 1,  line 18,  change "i e." to --i.e.--.

Column 4,  line 26,  delete "controller" and insert --processor--.

Column 4,  line 28,  delete "The" and insert --An--.

Column 4,  line 31,  delete "The" and insert --An--; and delete "the" and insert --a--.

Column 4,  line 32,  before "selection", delete "the" and insert --a--.

Column 4,  line 33,  delete "The" and insert --A--.

Column 4,  line 41,  change "i e." to --i.e.--.

Column 4,  line 61,  delete "4" and insert --four--.

UNITED STATES PATENT AND TRADEMARK OFFICE
CERTIFICATE OF CORRECTION

PATENT NO. : 5,568,023
DATED : Oct. 22, 1996
INVENTOR(S) : Grayer et al.

It is certified that errors appear in the above-identified patent and that said Letters Patent is hereby corrected as shown below:

Column 5, line 3, change "drive" to --driven--;

after "wheels", insert --11--; and after "motor", insert --3--.

Column 5, line 18, after "wheels", insert --11--.

Column 5, line 20, change "these" to --those--.

Column 5, line 32, change "(D.C.-to-D.C)" to --(D.C.-to-D.C.)--.

Column 5, line 35, after "turbine", change "1" to --1$b$--.

Column 5, line 41, after "conversation" insert --(ADC)--.

Column 5, line 42, after "modulation", insert --(PWM)--.

Column 5, line 47, change "time shared" to --time-shared--.

UNITED STATES PATENT AND TRADEMARK OFFICE
CERTIFICATE OF CORRECTION

PATENT NO.   : 5,568,023
DATED        : Oct. 22, 1996
INVENTOR(S)  : Grayer et al.

It is certified that errors appear in the above-identified patent and that said Letters Patent is hereby corrected as shown below:

Column 5,   line 58,   after "V6", insert --to thereby--.

Column 5,   line 61,   after "operation of", delete "the" and insert --any--.

Column 5,   line 63,   change "5$a$" to --5--.

Column 6,   line 4,    change "5$c$" to --5$e$--.

Column 6,   line 14,   change "5" to --5$d$--.

Column 6,   line 18,   change "5$b$" to --5--; and delete "more".

Column 6,   line 20,   change "l$a$ and l$b$" to --I$a$ and I$b$--; and delete "the" and insert --a--.

UNITED STATES PATENT AND TRADEMARK OFFICE
CERTIFICATE OF CORRECTION

PATENT NO. : 5,568,023
DATED : Oct. 22, 1996
INVENTOR(S) : Grayer et al.

It is certified that errors appear in the above-identified patent and that said Letters Patent is hereby corrected as shown below:

Column 6, line 22, change "I$d$" to --I$d$-- (both occurrences); and change "I$q$" to --I$q$--.

Column 6, line 23, change "I$q$" to --I$q$--.

Column 6, line 24, change "I$d$" to --I$d$--.

Column 6, line 28, delete "The" and insert --A--.

Column 6, line 29, change "5$j$" to --5$e$--; and delete "the" and insert --a--.

Column 6, line 33, delete "which".

Column 6, line 38, delete "13 shows" and insert --13$a$-$c$ show--.

Column 6, line 39, delete "c" and insert --a--; and

UNITED STATES PATENT AND TRADEMARK OFFICE
CERTIFICATE OF CORRECTION

PATENT NO.   : 5,568,023
DATED        : Oct. 22, 1996
INVENTOR(S)  : Grayer et al.

It is certified that errors appear in the above-identified patent and that said Letters Patent is hereby corrected as shown below:

Column 6, line 39, delete "a" and insert --c--.

Column 6, line 41, delete "upper state creates the" and insert --high state switches--.

Column 6, line 42, delete "ON state in"; and after "transistor", insert --ON--.

Column 6, line 43, delete "lower state creates" and insert --low state--.

Column 6, line 44, change "14" to --14$a$-14$c$--.

Column 6, line 45, change "15" to --15$a$-$c$--.

Column 6, line 51, change "ld" to --Id--.

Column 6, line 53, change "lq" to --Iq--.

Column 6, line 58, change "on" to --of--; and

UNITED STATES PATENT AND TRADEMARK OFFICE
CERTIFICATE OF CORRECTION

PATENT NO. : 5,568,023
DATED : Oct. 22, 1996
INVENTOR(S) : Grayer et al.

It is certified that errors appear in the above-identified patent and that said Letters Patent is hereby corrected as shown below:

Column 6, line 58, after "rotor", insert a comma --,--.

Column 7, line 15, change "6l" to --6a--.

Column 7, line 17, change "2" to --2a--; and after "circuit", insert --8a--.

Column 7, line 31, change "2" to --2b--.

Column 7, line 37, after "turbine", insert --unit--; and after "motor-generator", insert --1a,--.

Column 7, line 47, change "1" to --1a--.

Column 7, line 52, delete "lc" and insert --1d--.

Column 7, line 69, change "presented" to --represented--.

UNITED STATES PATENT AND TRADEMARK OFFICE
CERTIFICATE OF CORRECTION

PATENT NO. : 5,568,023
DATED : Oct. 22, 1996
INVENTOR(S) : Grayer et al.

It is certified that errors appear in the above-identified patent and that said Letters Patent is hereby corrected as shown below:

Column 8, line 19, after "turbine", insert --unit--.

Column 8, line 23, change "1" to --1$a$--.

Column 8, line 41, change "2" to --2$a$--.

Column 8, line 43, change "2's" to --2$a$'s--.

Column 9, line 61, delete "vehicle 5" and insert --vehicles--.

Column 9, line 62, after "bus", delete the comma ",".

Column 10, line 8, delete "1$e$".

Column 10, line 56, change "1$c$" to --1$d$--.

Column 10, line 65, after "engine", delete the comma "," and insert --and--.

UNITED STATES PATENT AND TRADEMARK OFFICE
CERTIFICATE OF CORRECTION

PATENT NO. : 5,568,023
DATED : October 22, 1996
INVENTOR(S) : Grayer, et. al.

It is certified that error appears in the above-identified patent and that said Letters Patent is hereby corrected as shown below:

Column 10, line 67, after "pollution, ", insert --reduction,--.

Signed and Sealed this

Tenth Day of March, 1998

*Attest:*

BRUCE LEHMAN

*Attesting Officer*     *Commissioner of Patents and Trademarks*